(12) United States Patent
Lucas et al.

(10) Patent No.: US 10,154,347 B2
(45) Date of Patent: Dec. 11, 2018

(54) BUSHINGS CONSTRAINED BY COMPRESSION IN LEVERED APPARATUS

(71) Applicant: Bose Corporation, Framingham, MA (US)

(72) Inventors: Brian M. Lucas, Marblehead, MA (US); Weidong Zhu, Newton, MA (US); Binu K. Oommen, Milford, MA (US); Brock N. Jacobites, Westborough, MA (US); Thomas A. Froeschle, Southborough, MA (US); Joseph A. Stabile, Worcester, MA (US); Christopher A. Pare, Franklin, MA (US); Wit Bushko, Medway, MA (US)

(73) Assignee: Bose Corporation, Framingham, MA (US)

( * ) Notice: Subject to any disclaimer, the term of this patent is extended or adjusted under 35 U.S.C. 154(b) by 179 days.

(21) Appl. No.: 14/921,541

(22) Filed: Oct. 23, 2015

(65) Prior Publication Data
US 2017/0118560 A1   Apr. 27, 2017

(51) Int. Cl.
*H04R 25/00* (2006.01)
*H04R 9/06* (2006.01)
(Continued)

(52) U.S. Cl.
CPC ............ *H04R 9/06* (2013.01); *F16F 1/3842* (2013.01); *H04R 7/16* (2013.01); *H04R 9/025* (2013.01);
(Continued)

(58) Field of Classification Search
CPC ........ H02K 21/28; H02K 21/12; H02K 21/26; H02K 21/30; H02K 21/32; H02K 7/00;
(Continued)

(56) References Cited

U.S. PATENT DOCUMENTS 1,718,357 A   6/1929  Miller
1,756,201 A   4/1930  Kiernan
(Continued)

FOREIGN PATENT DOCUMENTS

CN   102812728 A   12/2012
CN   203015064 U    6/2013
(Continued)

OTHER PUBLICATIONS

International Search Report and Written Opinion dated Aug. 4, 2014 for International application No. PCT/US2014/021559.
(Continued)

*Primary Examiner* — Davetta W Goins
*Assistant Examiner* — Phylesha Dabney
(74) *Attorney, Agent, or Firm* — Brian M. Dingman; Dingman IP Law, PC

(57) ABSTRACT

A loudspeaker includes an acoustic diaphragm, an oscillatory force source, a lever coupling the oscillatory force source to the acoustic diaphragm, and a pivot coupled to the lever such that the lever moves in an arcuate path about the pivot when the oscillatory force source applies a force to the lever. The pivot includes at least one torsion bushing. The at least one torsion bushing includes a first member, a second member coupled to the lever and movable relative to the first member, and an elastomeric member coupling the first member to the second member. Either the first member or the second member is coupled to and moves with the lever. An outer surface of the elastomeric member is coupled to the second member via mechanical compression.

24 Claims, 15 Drawing Sheets

(51) Int. Cl.
*H04R 9/02* (2006.01)
*H04R 7/16* (2006.01)
*F16F 1/38* (2006.01)

(52) U.S. Cl.
CPC ......... *F16F 1/3863* (2013.01); *F16F 2228/08* (2013.01); *F16F 2236/085* (2013.01)

(58) Field of Classification Search
CPC .......... H02K 7/003; H02K 7/061; H02K 7/06; H02K 7/063; H02K 7/065; H02K 7/08; H02K 35/00; H02K 35/02; H02K 35/04; H02K 35/06; H02K 33/00; H02K 33/02; H02K 33/12; H02K 1/34; H04R 1/283; H04R 1/2834; H04R 1/2807; H04R 11/00; H04R 11/02
USPC ............... 381/345, 161, 162, 395, 417, 418; 181/148
See application file for complete search history.

(56) References Cited

U.S. PATENT DOCUMENTS

| | | | |
|---|---|---|---|
| 1,823,512 A | | 9/1931 | Ringel |
| 1,950,857 A | * | 3/1934 | McGall ................. H04R 11/02 188/10 |
| 1,973,277 A | | 9/1934 | Barfield |
| 2,035,104 A | | 3/1936 | Thomas |
| 2,078,469 A | | 4/1937 | Thomas |
| 2,245,511 A | | 6/1941 | Turnbull |
| 3,777,078 A | | 12/1973 | Boutros-Attia et al. |
| 3,836,733 A | * | 9/1974 | Cragg ................. H04R 11/00 335/231 |
| 3,937,904 A | | 2/1976 | Parker |
| 4,542,311 A | | 9/1985 | Newman et al. |
| 4,626,717 A | | 12/1986 | Hensing et al. |
| 5,216,723 A | | 6/1993 | Froeschle et al. |
| 5,595,541 A | * | 1/1997 | Ducugnon ................. F16D 3/54 464/154 |
| 5,757,947 A | * | 5/1998 | Van Halteren ......... H04R 11/00 381/322 |
| 5,802,189 A | | 9/1998 | Blodget ................. H04R 23/00 310/154.01 |
| 6,405,599 B1 | | 6/2002 | Patt |
| 6,415,037 B1 | | 7/2002 | Wang |
| 7,206,428 B2 | * | 4/2007 | Geschiere ............ H04R 25/604 381/324 |
| 7,247,957 B2 | | 7/2007 | Dadd |
| 7,336,797 B2 | * | 2/2008 | Thompson ............... H04R 7/20 381/324 |
| 7,443,997 B2 | * | 10/2008 | Miller ................... H04R 11/02 381/322 |
| 8,135,163 B2 | * | 3/2012 | Blanchard ................ H04R 3/14 381/349 |
| 8,139,813 B2 | | 3/2012 | Kobayashi et al. |
| 8,295,537 B2 | * | 10/2012 | Carlmark ............... H04R 11/02 381/398 |
| 8,549,733 B2 | * | 10/2013 | Bedwell ................. H04R 11/02 156/268 |
| 9,020,173 B2 | * | 4/2015 | Burns .................... H04R 25/50 381/312 |
| 9,100,740 B2 | | 8/2015 | Huang |
| 9,258,648 B2 | | 2/2016 | Lucas et al. |
| 9,423,591 B2 | * | 8/2016 | Mori ..................... G02B 7/1821 |
| 2002/0003890 A1 | * | 1/2002 | Warren ................. H04R 11/02 381/418 |
| 2008/0247595 A1 | | 10/2008 | Henry |
| 2009/0028371 A1 | | 1/2009 | Bailey |
| 2011/0243365 A1 | | 10/2011 | Carlmark et al. |
| 2011/0243366 A1 | | 10/2011 | Carlmark et al. |
| 2012/0106772 A1 | | 5/2012 | Horigome et al. |
| 2012/0248899 A1 | | 10/2012 | Oommen et al. |
| 2013/0315436 A1 | * | 11/2013 | Miller .................... H04R 11/02 381/418 |
| 2014/0064539 A1 | * | 3/2014 | Link .................... H04R 1/2834 381/345 |
| 2014/0270328 A1 | | 9/2014 | Lucas et al. |
| 2014/0334662 A1 | | 11/2014 | Lin |
| 2015/0256046 A1 | | 9/2015 | Lucas et al. |
| 2015/0256911 A1 | | 9/2015 | Lucas et al. |
| 2015/0256935 A1 | | 9/2015 | Lucas et al. |
| 2015/0256936 A1 | | 9/2015 | Lucas et al. |

FOREIGN PATENT DOCUMENTS

| | | |
|---|---|---|
| CN | 203193871 U | 9/2013 |
| GB | 212648 A | 3/1924 |
| GB | 1124830 A | 8/1968 |
| JP | S6212300 | 1/1987 |
| JP | 2009225091 A | 10/2009 |

OTHER PUBLICATIONS

International Search Report and Written Opinion dated Aug. 4, 2014 for International application No. PCT/US2014/021592.
International Search Report and Written Opinion dated Jun. 2, 2015 for International application No. PCT/US2015/018279.
International Search Report and Written Opinion dated May 26, 2015 for International application No. PCT/US2015/018699.
International Search Report and Written Opinion dated May 20, 2015 for International application No. PCT/US2015/018702.
International Search Report and Written Opinion dated May 29, 2015 for International application No. PCT/US2015/018714.
http://bushingsinc.com/index.php/bushings-inc-products-lines/rubber-flex-bushings; retrieved 2007.
First Chinese Office Action dated Jun. 8, 2017 for Chinese Patent Application No. 201480015453X.

* cited by examiner

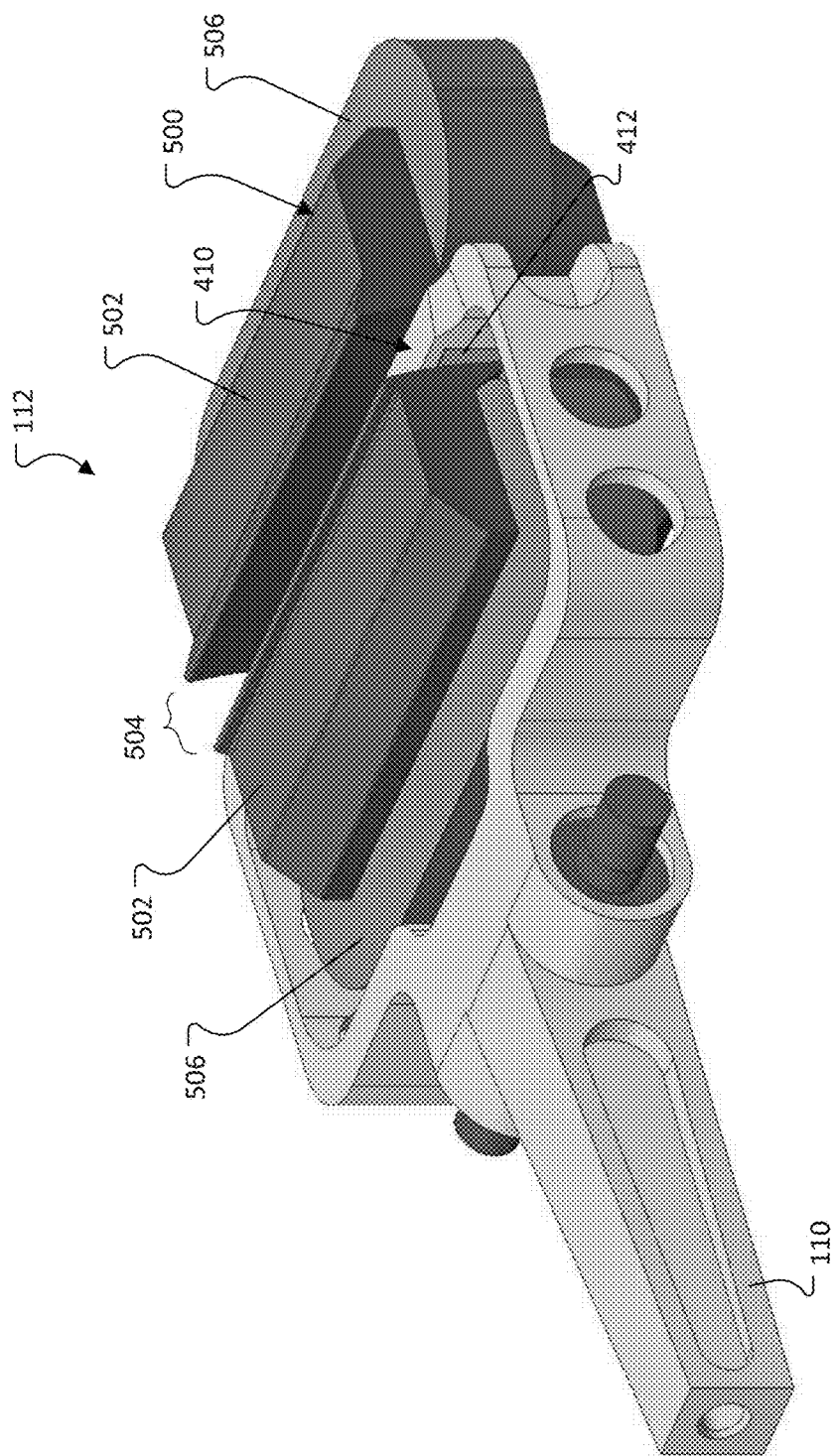

BUSHINGS CONSTRAINED BY COMPRESSION IN LEVERED APPARATUS

BACKGROUND

This disclosure relates to bushings constrained by compression in levered apparatus, and more particularly to elastomeric torsion bushings which provide pivots for lever arms used to drive motion of acoustic diaphragms in loudspeakers.

U.S. patent application Ser. No. 14/200,614, filed Mar. 7, 2014 describes a levered loudspeaker that employs elastomeric torsion bushings to provide pivots for lever arms to drive motion of an acoustic diaphragm. The bushings are bonded, e.g., via adhesive or molded-in-place, at their outer and inner diameters.

Elastomers are almost incompressible, and typically shrink at curing, leading to high residual stresses at bushing ends. This is especially true for highly confined configurations, i.e., when the bushing length is much larger than the difference of its outer and inner diameters.

SUMMARY

This disclosure is based, in part, on the realization that an improved bushing may be provided by molding an elastomer to form about an inner member (e.g., a pin), and then compressing the elastomer at its outer diameter via a second member (e.g., an outer cylindrical sleeve). At the elastomer's outer diameter, slippage is prevented by friction, and separation is prevented by the compression. Residual stresses from molding at the inner diameter and compression at outer diameter of the elastomer are lower than those from molding at both inner and outer diameters of the elastomer. Bushing rotation stiffness, a critical parameter for suspension stiffness, is shown insensitive to the extent of compression.

In one aspect, a loudspeaker includes an acoustic diaphragm, an oscillatory force source, a lever coupling the oscillatory force source to the acoustic diaphragm, and a pivot coupled to the lever such that the lever moves in an arcuate path about an axis of the pivot when the oscillatory force source applies a force to the lever. The pivot includes at least one torsion bushing. The at least one torsion bushing includes a first member, a second member movable relative to the first member, and an elastomeric member coupling the first member to the second member. Either the first member or the second member is coupled to and moves with the lever. An outer surface of the elastomeric member is coupled to the second member via mechanical compression.

Implementations may include one of the following features, or any combination thereof.

In some implementations, the outer surface of the elastomeric member engages an inner surface of the second member in an interference fit.

In certain implementations, in an unloaded (uncompressed) state the elastomeric member has cylindrical outer surface having a first diameter, and the second member has a cylindrical inner surface having a second diameter, and wherein the first diameter is larger than the second diameter.

In some examples, the outer surface of the elastomeric member is compressed between 6% and 14% (i.e., a 6% to 14% reduction in dimension, e.g., reduced diameter).

In certain examples, the torsion bushing also includes granular particles that are disposed between the outer surface of the elastomeric member and the inner surface of the second member and which provide increased friction therebetween.

In some cases, the granular particles are supported in a semisolid lubricant (grease) or high viscosity liquid which substantially evaporates or dries out after assembly.

In certain cases, the oscillatory force source includes a moving magnet motor.

In some implementations, the oscillatory force source includes a moving coil motor.

In certain implementations, wherein the second member increases a first clamp portion and a second clamp portion, which mechanically couples to the first clamp portion to compress the elastomeric member therebetween.

In some examples, the first clamp portion includes a first (semi-cylindrical or concave) surface for engaging a first section of the outer surface of the elastomeric member, and the second clamp portion includes a second (semi-cylindrical or concave) surface for engaging a second section of the outer surface of the elastomeric member.

In certain examples, the first clamp portion is coupled to the lever (e.g., via fasteners, welding, or formed integrally therewith).

In certain cases, the elastomeric member circumferentially surrounds the first member and has an inner surface that is bonded to an outer surface of the first member.

In some implementations, the elastomeric member is cylindrical and coaxial with first member.

In certain implementations, the inner surface of the elastomeric member is bonded to the outer surface of the first member with an adhesive In some examples, the elastomeric member is molded in place about the outer surface of the first member.

In certain examples, the second member is swaged over the elastomeric member.

In some cases, the pivot includes a compression sleeve disposed between the second member and the elastomeric member, and the outer surface of the elastomeric member is coupled to the second member via the compression sleeve.

In some implementations, the second member engages the compression sleeve to exert compression on the elastomeric member.

In certain implementations, the compression sleeve includes one or more slots for accommodating compression of the compression sleeve about the elastomeric member.

In some examples, the compression sleeve has a cylindrical outer surface which engages a cylindrical inner surface of the second member.

In certain examples, the compression sleeve has a cylindrical inner surface which engages a cylindrical outer surface of the elastomeric member.

In another aspect, an apparatus includes a load, an oscillatory force source, a lever coupling the oscillatory force source to the load, and a pivot coupled to the lever such that the lever moves in an arcuate path about an axis of the pivot when the oscillatory force source applies a force to the lever. The pivot includes at least one torsion bushing. The at least one torsion bushing includes a first member, a second member movable relative to the first member, and an elastomeric member coupling the first member to the second member. Either the first member or the second member is coupled to and moves with the lever. An outer surface of the elastomeric member is coupled to the second member via mechanical compression.

Implementations may include one of the above features, or any combination thereof.

Other aspects, features, and advantages are in the description, drawings, and claims.

BRIEF DESCRIPTION OF THE DRAWINGS

FIG. 5A is perspective view of the pivot and lever of FIG. 3A together with a moving magnet motor.

DETAILED DESCRIPTION

Figure 1A:
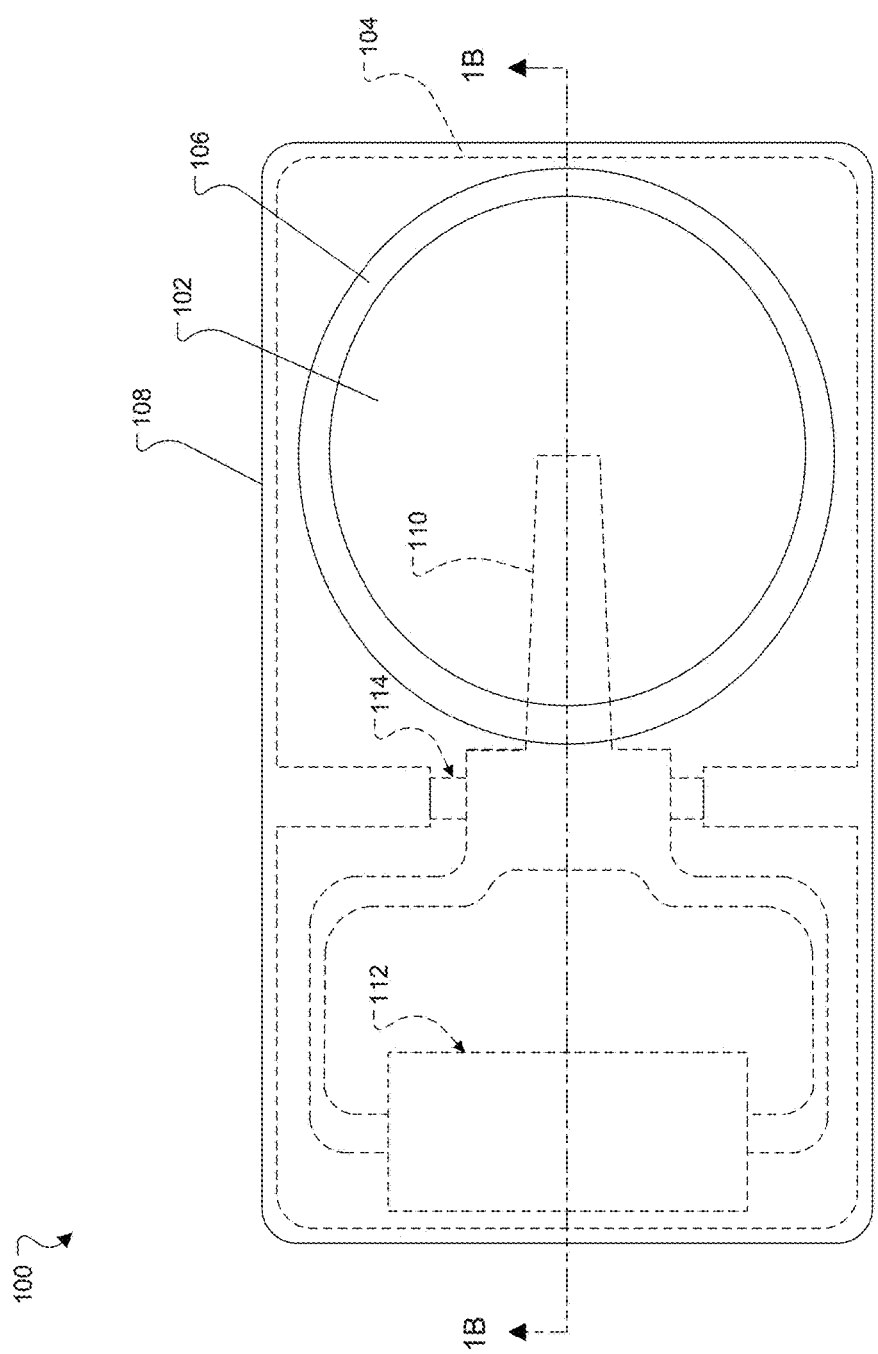
FIG. 1A is a top plan view of a loudspeaker that employs an elastomeric torsion bushing for providing a pivot for a lever that drives an acoustic diaphragm.
Figure 1B:
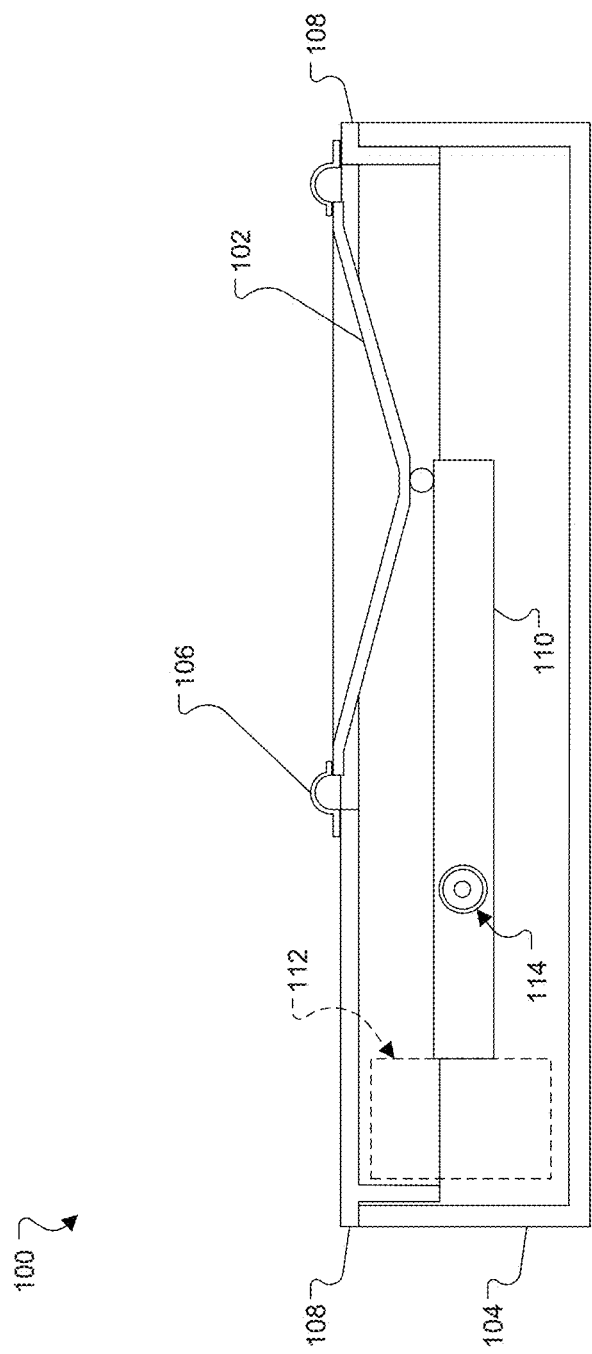
FIG. 1B is a cross-sectional side view of the loudspeaker of FIG. 1A, taken along line 1B-1B.

Referring to FIGS. 1A and 1B loudspeaker 100 includes an acoustic diaphragm 102 (e.g., a cone type speaker diaphragm, also known simply as a "cone") that is mounted to an enclosure 104, which may be metal, plastic, or other suitable material, by a surround 106, which functions as a pneumatic seal and as a suspension element. For example, in some instances the surround 106 is mounted to a frame 108 and the frame 108 is connected to the enclosure 104. The loudspeaker 100 includes a lever 110 that is mechanically connected at one point along the lever 110 to the acoustic diaphragm 102 and at another point along the lever 110 to an oscillatory force source 112.

Figure 2:
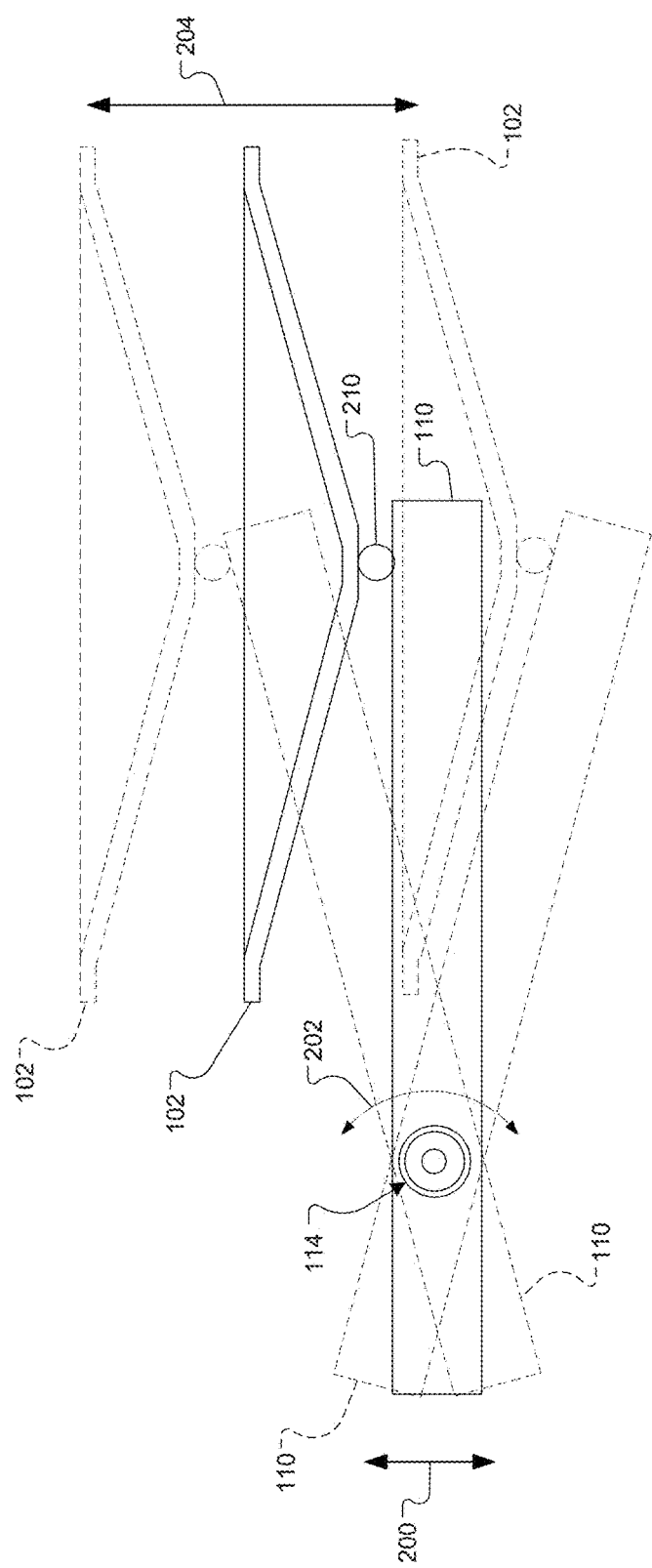
FIG. 2 illustrates oscillatory, arcuate movement of the lever and pistonic movement of an acoustic diaphragm of the loudspeaker of FIG. 1A.

The lever 110 is pivotally connected to a mechanical ground reference, such as the enclosure 104 or the frame 108, via a pivot 114. As illustrated in FIG. 2, when an oscillatory force (arrow 200) is applied to the lever 110 via the oscillatory force source 112 (FIG. 1A), the lever 110 is driven in an arcuate path (arrow 202) about the pivot 114. The motion of the lever 110 is transferred to the acoustic diaphragm 102 via the connection point, which causes the acoustic diaphragm 102 to move along a path (arrow 204) between a fully extended position and a fully retracted position. In some cases, the connection point may include a connector 210 such as a hinge or link, which allows the lever 110 to move relative to the acoustic diaphragm 102, thereby to allow the acoustic diaphragm 102 to move in a pistonic motion (arrow 204), rather than following the arcuate path of the lever 110.

Figure 3A:
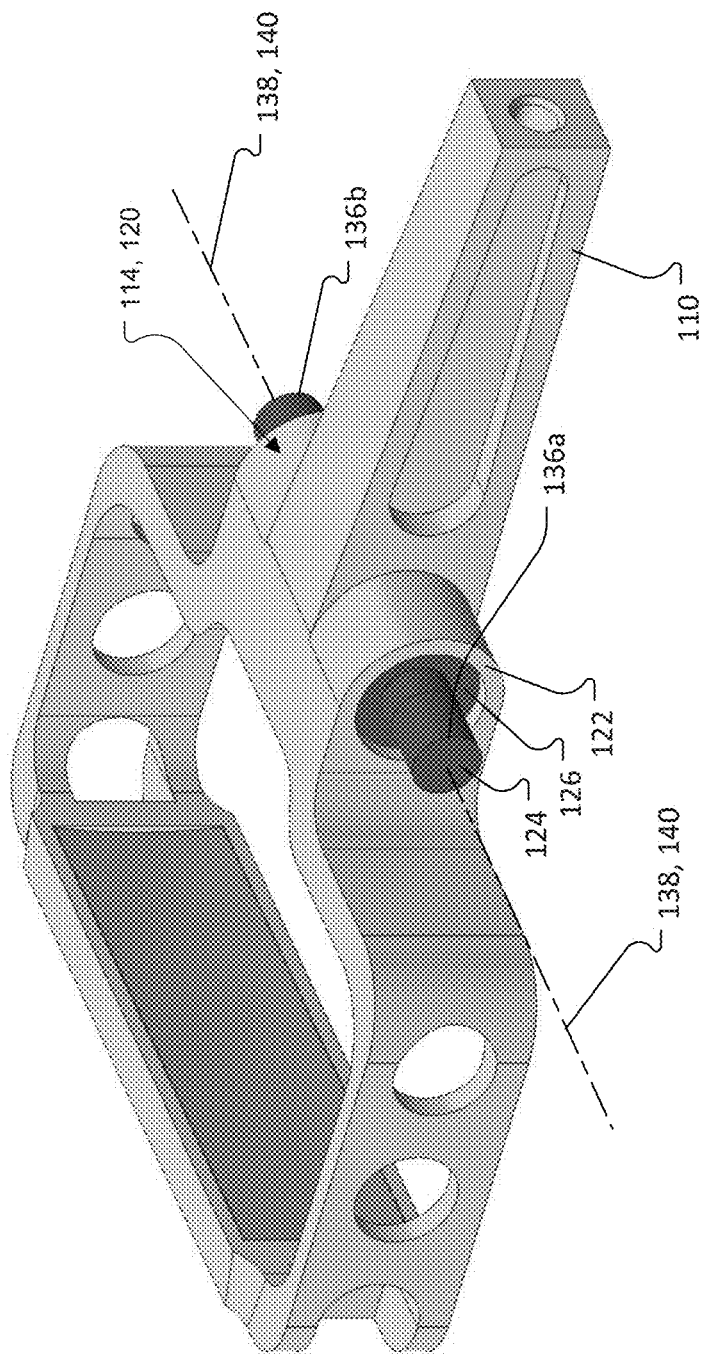
FIGS. 3A & 3B are perspective and side views, respectively, of an implementation of the pivot and lever from the loudspeaker of FIG. 1A.
Figure 3B:
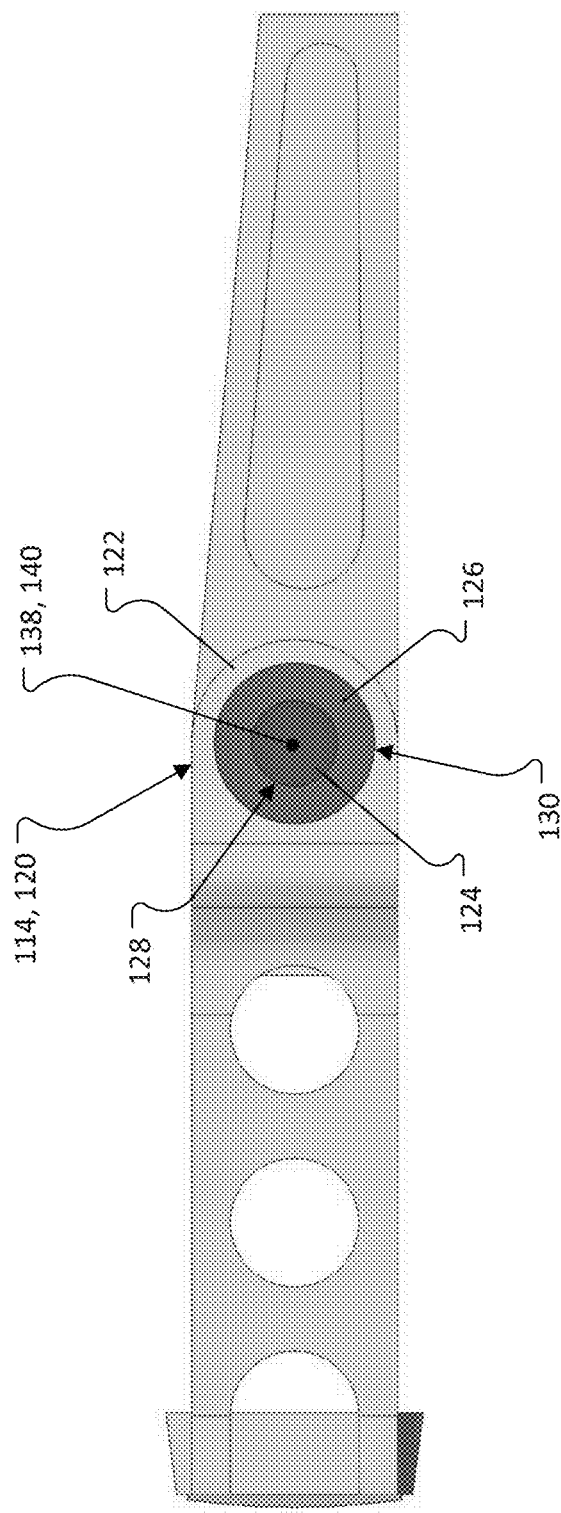

To facilitate the arcuate motion of the lever 110, the pivot 114 includes at least one elastomeric torsion bushing. FIGS. 3A & 3B illustrate one implementation of the pivot 114 which includes such an elastomeric torsion bushing 120. The elastomeric torsion bushing 120 provides a low cost, frictionless hinge for the lever 110.

The bushing 120 includes a first, outer (housing) member 122; a second, inner (pin) member 124; and an elastomeric member 126 disposed therebetween. A first, inner surface 128 of the elastomeric member 126 is bonded to the inner member 124 and a second, outer surface 130 of the elastomeric member 126 is coupled to the outer member 122 via compression such that the outer surface 130 of the elastomeric member 126 moves with the outer member 122, during rotation of the lever 110, relative to the inner surface 128. At the outer surface 130 of the elastomeric member 126, slippage relative to the outer member 122 is inhibited by friction, and separation is inhibited by compression. Such compression bushings exhibit a better fatigue life than mold-in-place bearings, which is a substantial benefit for transducer suspension elements.

At least one of the opposing ends 136a, 136b of the inner member 124 is fixed to a mechanical ground reference, such as the enclosure 104 (FIG. 1A) or the frame 108 (FIG. 1A) and such that a longitudinal axis 138 of the inner member 124 is coincident with the axis of rotation 140 of the lever 110. The outer member 122 is coaxial with the inner member 124 and is secured to the lever 110 such that the outer member 122 rotates with the lever 110 relative to the inner member 124. In some cases, the lever 110 and the outer member 122 may both be part of one unitary structure. For this case, the inner surface of elastomeric member 126 is fixed and remains stationary to the mechanical ground reference, and the outer surface of the elastomeric member 126 moves with the lever 110.

The outer and inner members 122, 124 can be formed of a metal, such as steel, aluminum, or other suitable high stiffness material (e.g., plastics). The elastomeric member 126 is formed of an elastomer, such as silicone rubber, polyurethane, etc. Silicone materials may be beneficial because they tend to exhibit very good properties of creep. Silicone rubber, for example, can offer several material property benefits, such as temperature stability; low (tunable) modulus; low, moderate, or high dissipation factor (tan δ) is possible; good creep resistance; fast curing using catalysts and elevated temperatures; injection moldable; can offer very high elongation (e.g., about 900%); and can offer a stable modulus over a wide range of frequencies.

The elastomeric member 126 is formed around an outer surface of the inner member 124 using a mold-in-place process, which provides sufficiently high strength bonding between the elastomeric member 126 and the inner member 124. The elastomeric member 126 may alternatively be formed (e.g., molded and/or machined) separately and then bonded to the inner member 124 using an adhesive.

In the illustrated example, the elastomeric member 126 is in the form of a hollow cylinder which concentrically surrounds a cylindrical outer surface of the inner member 124. The outer surface of the elastomeric member 126 is configured to engage the inner surface of the outer member 122, shown as an integral part of the lever 110, in an interference fit. In that regard, the diameter of the cylindrical outer surface (a/k/a the outer diameter or OD) of elastomeric member 126 is formed to be larger than a diameter of a cylindrical inner surface (a/k/a the inner diameter or ID) of the outer member 122. The elastomeric member 126 is compressed between 6% and 14%. That is, the diameter of the elastomeric member 126 is 6% to 14% smaller in the compressed state than in the uncompressed state.

Figure 4:
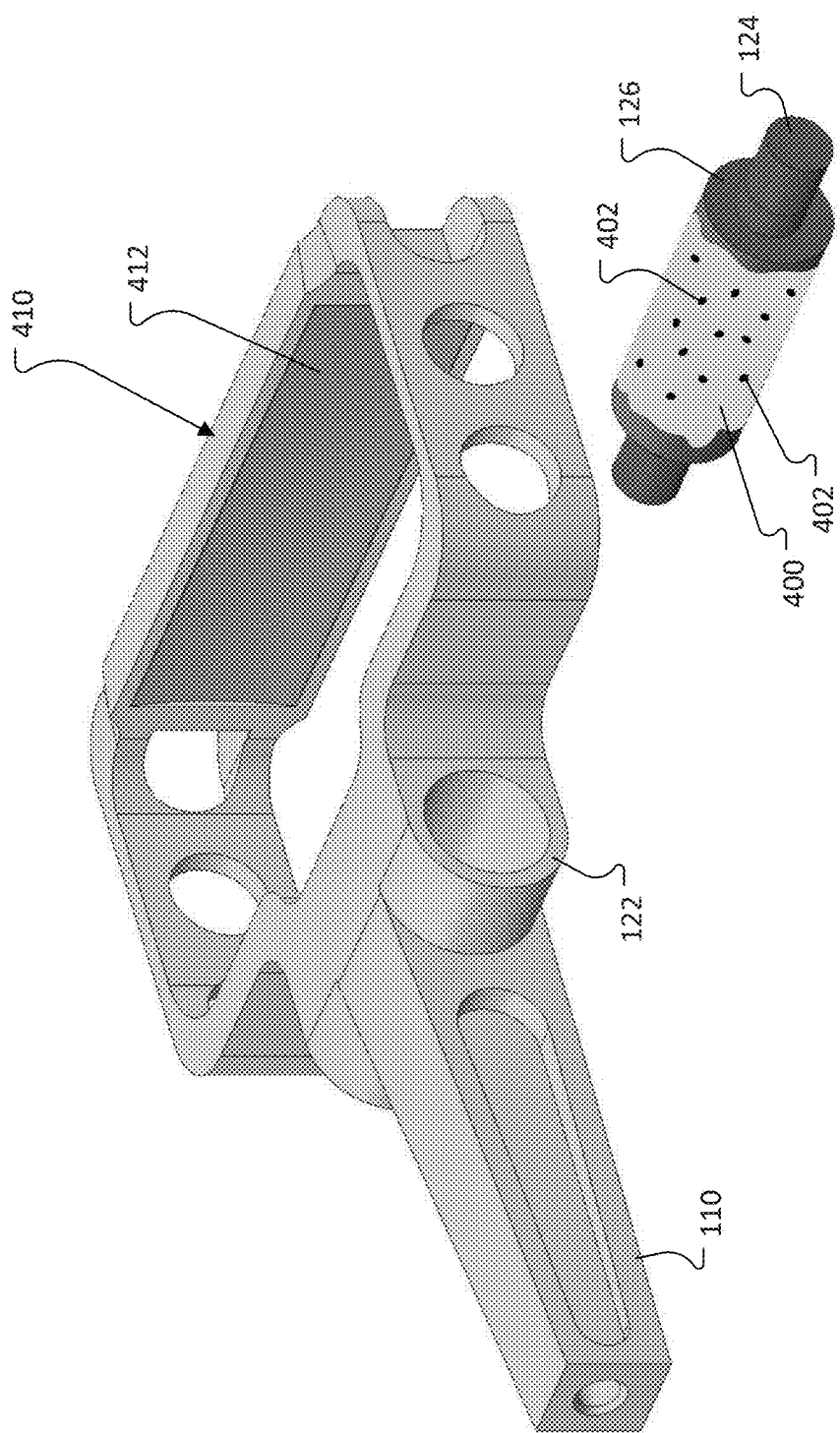
FIG. 4 is an exploded perspective view of the pivot and lever of FIG. 3A.

Referring to FIG. 4, a lubricious coating 400 may be applied to the outer surface of the elastomeric member 126 to help facilitate insertion of the elastomeric member 126 into the outer member 122. The lubricious coating 400 may comprise a semisolid lubricant (e.g., grease such as silicone grease) or a high viscosity liquid which substantially evaporates or dries out after assembly. In some cases, granular particles 402 are suspended in the lubricious coating 400. When the lubricant portion of the coating dries out or evaporates, the granular particles 402 are left behind at the interface between the outer surface of the elastomeric member 126 and the inner surface of the outer member 122. The granular particles 402 can help to provided added friction along those surfaces to substantially inhibit (e.g., prevent) relative movement between those surfaces. Preferably, a coefficient of friction, $\mu$, of at least 0.3 is provided at the interface of the elastomeric member 126 and the outer member 122 in order to inhibit (e.g., prevent) slippage.

Figure 5B:
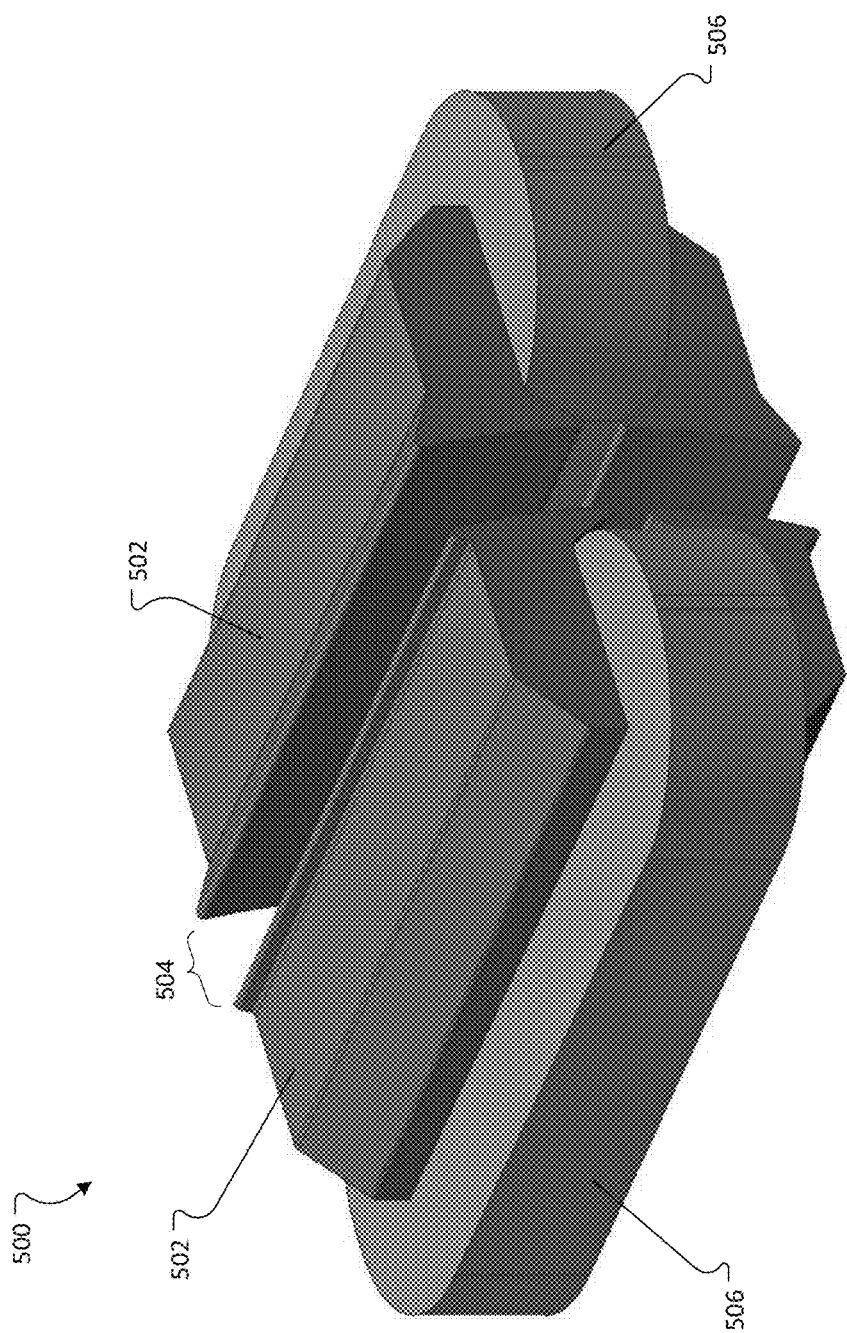
FIG. 5B is a perspective view of a stator from the moving magnet motor of FIG. 5A.

FIGS. 4, 5A, and 5B illustrate one implementation of the oscillatory force source 112 (FIG. 5A) for applying force to the lever 110. In the illustrated implementation, the oscillatory force source 112 includes a substantially planar armature 410 (FIG. 4) that is attached to the lever 110. The armature 410 includes one or more permanent magnets 412 (one shown). The armature 410 and the lever 110 may be part of one unitary structure. Referring to FIGS. 5A and 5B, the oscillatory force source 112 also includes a stator 500 that includes one or more cores 502 (two shown) which define an air gap 504. The cores 502 are formed of high magnetic permeability material around which coils 506 are wound. The lever 110 is positioned such that the armature 410 is in the air gap 504 and electrical current is passed through the coils 506 so that the combination of the armature 410, the cores 502, and the coils 506 form a moving magnet motor. In this arrangement, the force results from the interaction of the magnetic field in the gap 504 due to the current flowing in the coils 506 and the magnetic field of the permanent magnet 412, so the force is applied to the lever 110 in a non-contact manner.

Other Implementations

Figure 6A:
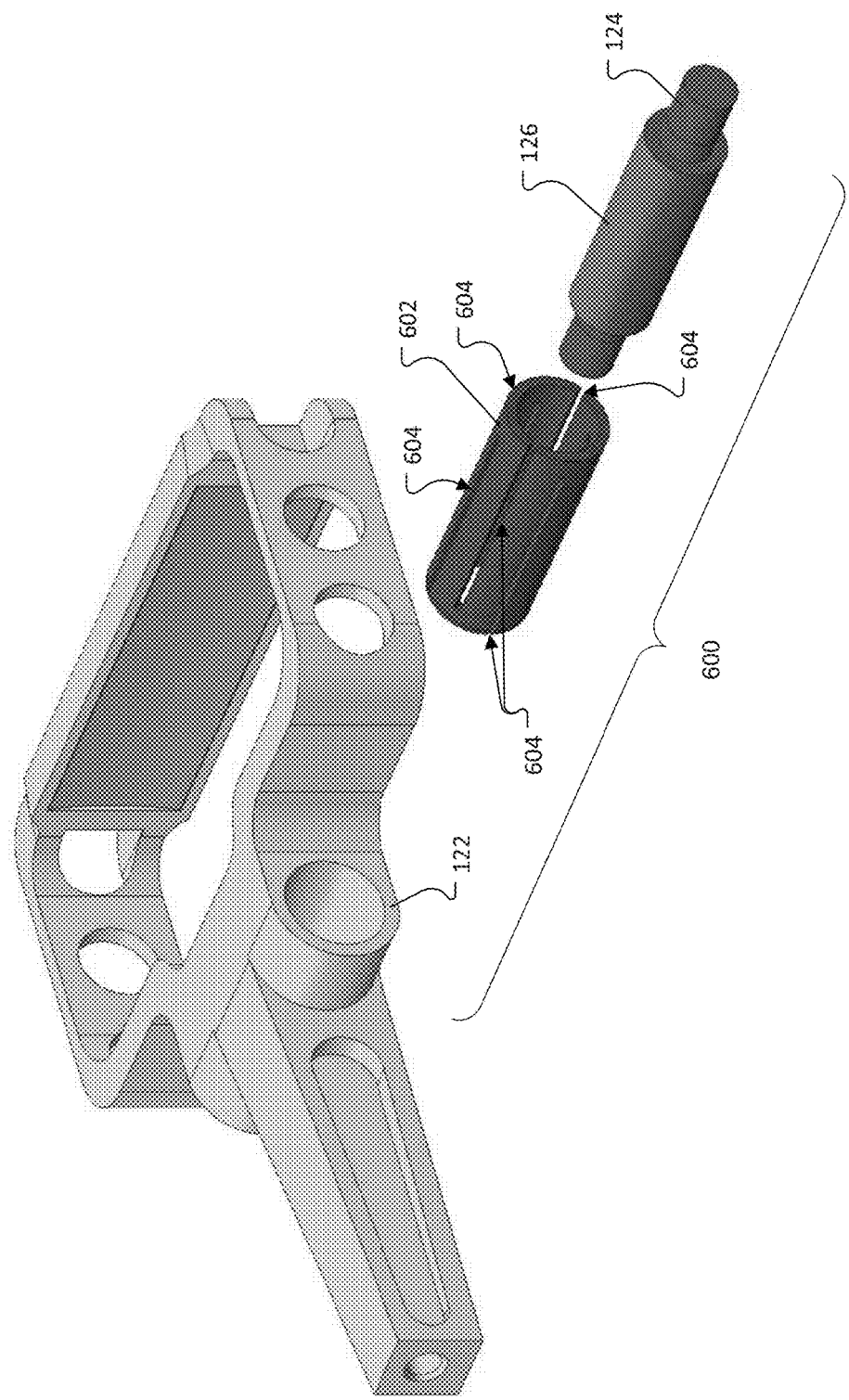
FIGS. 6A & 6B are exploded perspective and perspective views, respectively, of a second implementation of the pivot and lever for use with the loudspeaker of FIG. 1A.
Figure 6B:
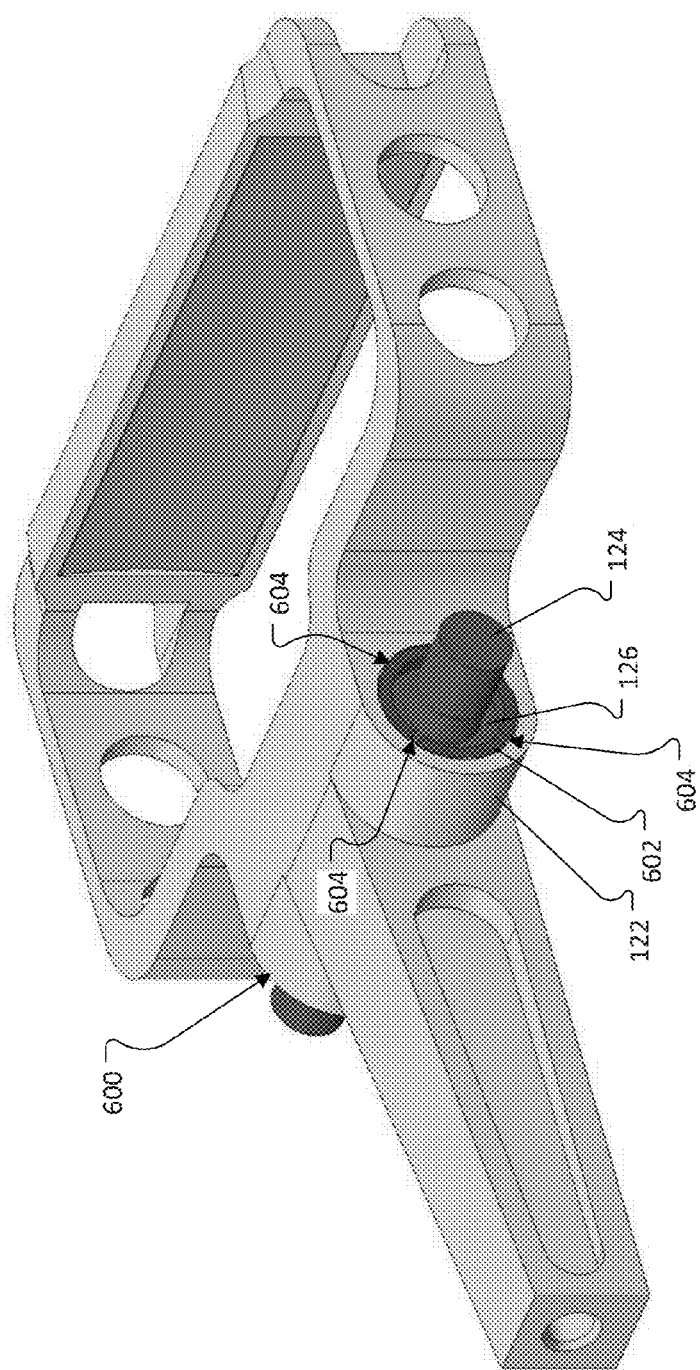

FIGS. 6A and 6B illustrate yet another implementation of a pivot 600 that can be employed, for example, in the loudspeaker 100 of FIG. 1A. The pivot 600 includes a compression sleeve 602 that is disposed between the second member 122 and the elastomeric member 126. The second member 122 engages the compression sleeve 602 to radially compress the compression sleeve 602 and thereby exert compression on the elastomeric member 126. In this configuration, the outer diameter of the elastomeric member 126 may be smaller than the inner diameter of the outer member 122, and the compression sleeve 602 provides the interference fit therebetween.

The compression sleeve 602 has a cylindrical inner surface which engages the cylindrical outer surface of the elastomeric member 126, and a cylindrical outer surface which engages a cylindrical inner surface of the outer member 122. The compression sleeve 602 includes a plurality of slots 604 which are spaced radially about the compression sleeve 602. The slots 604 allow the compression sleeve 602 to be compressed, such that it is reduced in diameter, about the elastomeric member 126 as it slid into the outer member 122 during assembly. The compression sleeve 602 may be formed from tool steel.

In an uncompressed state the compression sleeve 602 has an outer diameter that is 0.062 mm to 0.136 mm (e.g., about 0.099 mm) larger than the inner diameter of the outer member 122. In one exemplary implementation, the inner member 124 has an outer diameter of 2.0 mm; the elastomeric member 126 has an inner diameter of 2.000 mm and an uncompressed outer diameter of 3.074 mm; the compression sleeve 602 has an uncompressed inner diameter of 3.074 mm and an uncompressed outer diameter of 3.849 mm; and the outer member 122 has an inner diameter of 3.750 mm. This compression is a function of torque. Where the required torque is not too large, the amount of compression may be lower.

Figure 7A:
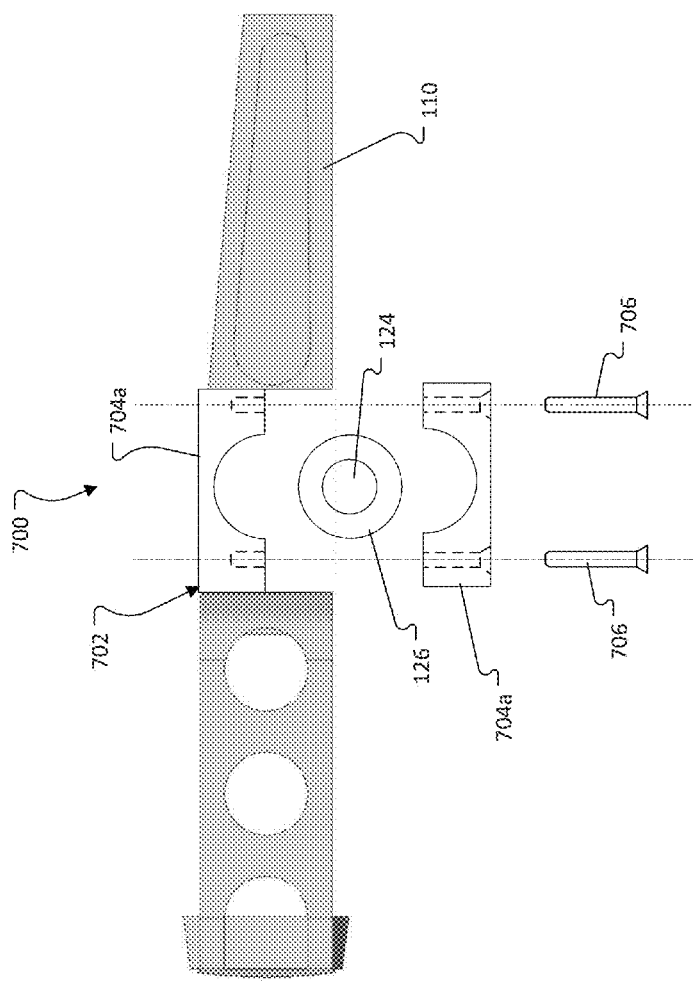
FIGS. 7A, 7B, & 7C are exploded side, side, and bottom views, respectively, of a third implementation of a pivot and lever for use with the loudspeaker of FIG. 1A.
Figure 7B:
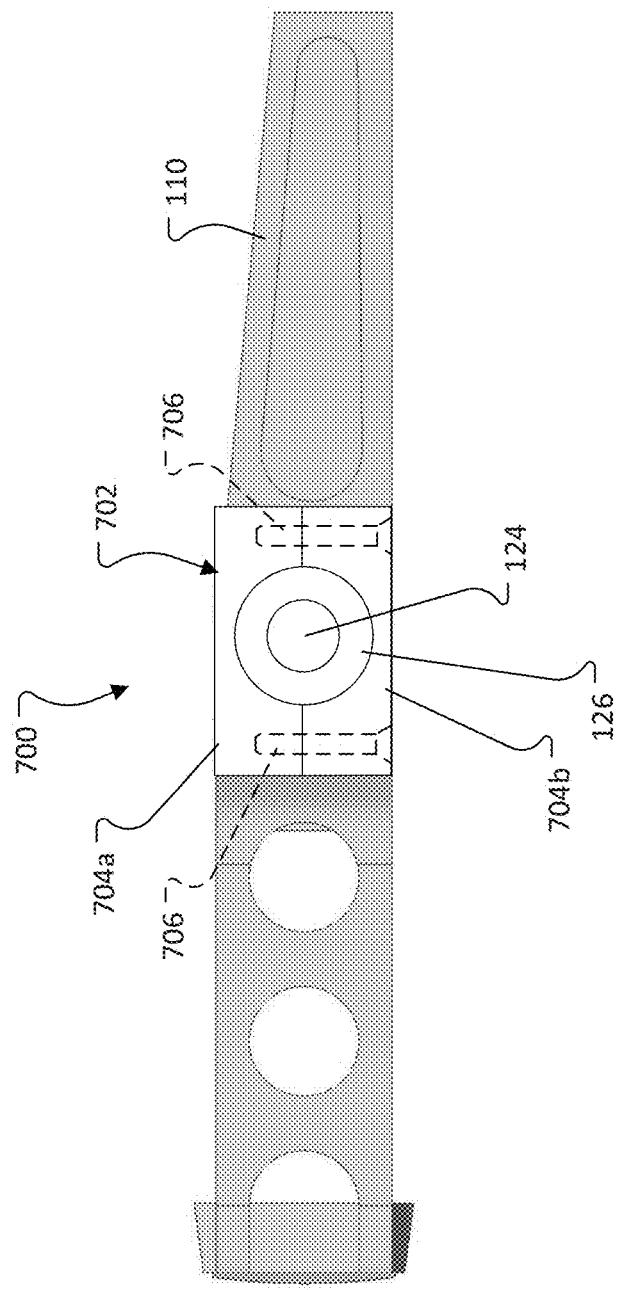
Figure 7C:
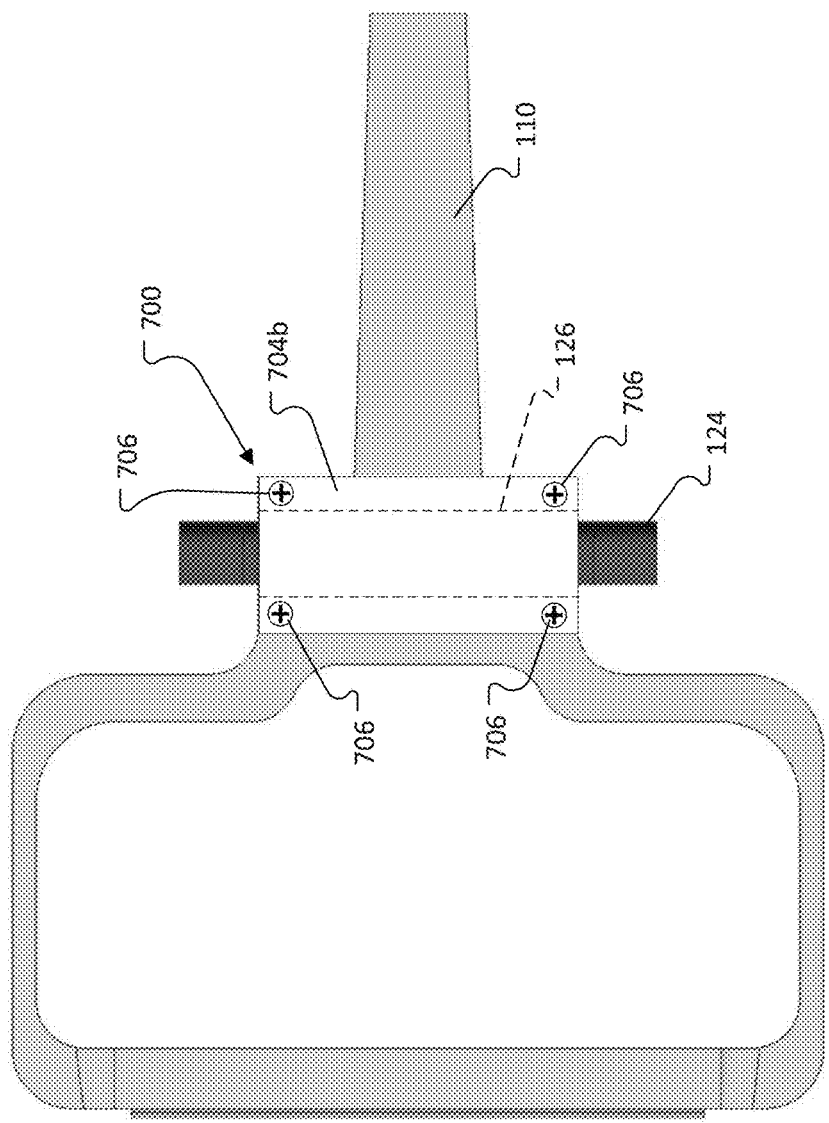

FIGS. 7A-7C illustrate another implementation of a pivot 700 that can be employed, for example, in the loudspeaker 100 of FIG. 1A. In the pivot 700 of FIGS. 7A & 7B an outer member 702 includes a plurality of clamp portions 704a, 704b which can be coupled together to apply a compressive force to the elastomeric member 126.

In the illustrated example, the outer member 702 comprises a first clamp portion 704a and a second clamp portion 704b. The second clamp portion 704b mechanically couples to the first clamp portion 704a to compress the elastomeric member therebetween. The first clamp portion 704a includes a first semi-cylindrical (concave) surface for engaging a first section of the outer surface of the elastomeric member 126, and the second clamp portion 704b includes a second semi-cylindrical (concave) surface for engaging a second section of the outer surface of the elastomeric member 126. In the illustrated example, the second clamp portion 704b couples to the first clamp member 704a via fasteners 706 (e.g., screws).

The first clamp portion 704a may be coupled to the lever 110 via fasteners, adhesive, or welding. Alternatively, the first clamp portion 704a may be formed integrally with the lever 110 such as in a molding process.

Alternatively or additionally, the outer member may be forced into compressive contact with the elastomeric member by having its diameter reduced in a swaging process. For example, the outer member may take the form of a hollow metal cylinder. The inner diameter of the outer member may initially be larger than the outer diameter of the elastomeric member thereby allowing the elastomeric member to be inserted into the hollow center of the outer member. Then, the outer member is swaged into compression with the outer surface of elastomeric member. Following the swaging process, the outer member may be secured to the lever, e.g., via welding, adhesive, or with fasteners.

Figure 8A:
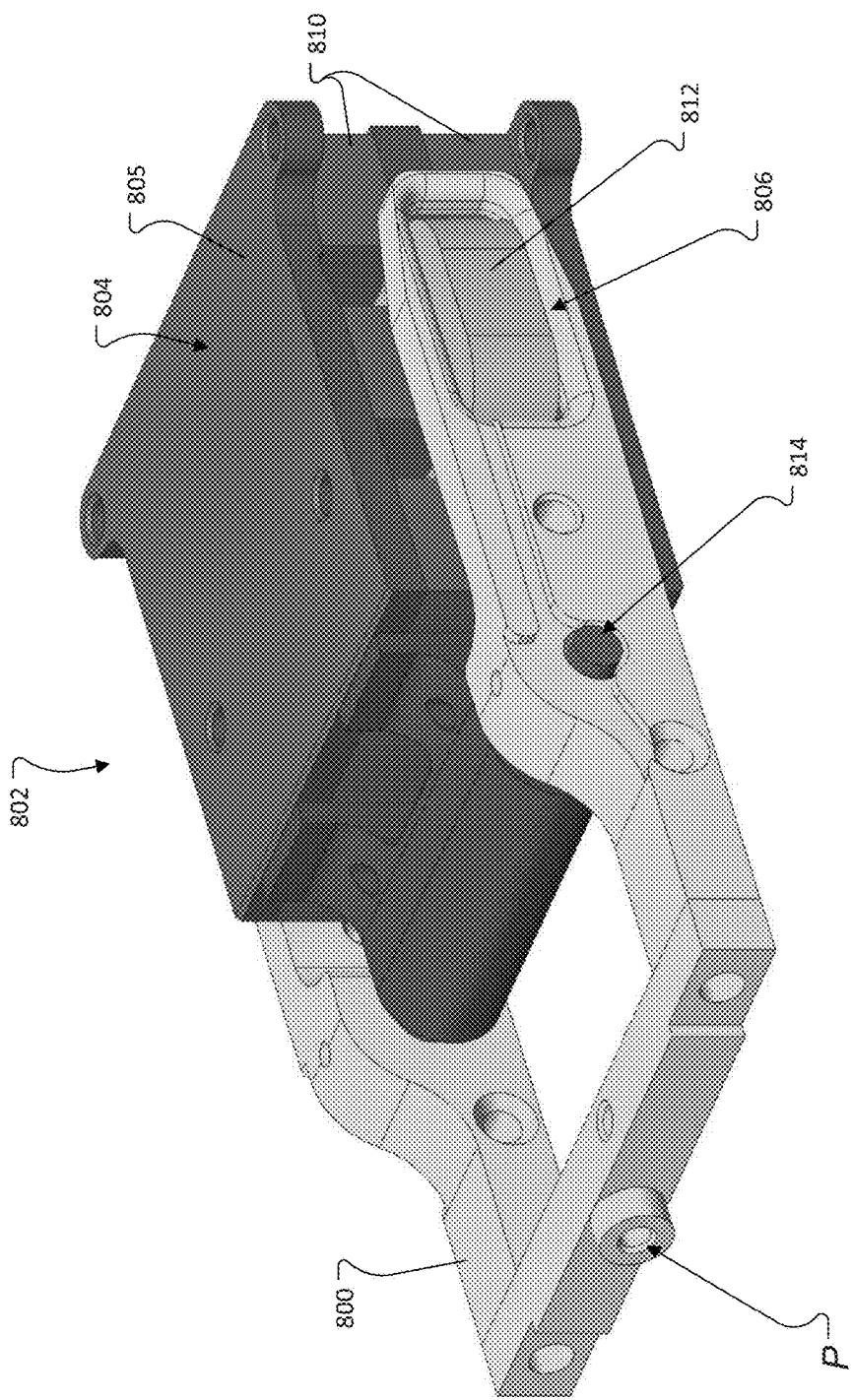
FIG. 8A is perspective view of an alternative implementation of a lever and pivot together with a moving coil motor.

Although an oscillatory force source in the form of a moving magnet motor has been described, other configurations are possible. For example, FIG. 8A illustrates an implementation of a lever 800 driven by an oscillatory force source in the form of a moving coil motor 802. The motor 802 includes a magnetic circuit 804, and a voice coil assembly 806, which is mechanically secured to the lever 800 and is driven in motion by the magnetic circuit 804.

The magnetic circuit 804 generally includes one or more permanent magnets 810 (six shown, FIG. 8B) to provide a permanent magnetic field to oppose an alternating electromagnetic field of the voice coil assembly 806 and thereby cause the lever 800 to move upward and downward. The magnetic circuit 804 may also include one or more components (e.g., plates 805) formed of a magnetically permeable material to help define the magnetic flux path.

The voice coil assembly 806 includes a voice coil 812 and a bobbin (not shown) that is attached to the lever 800. The voice coil 812 is a coil of wire, usually copper or aluminum, through which an electrical audio signal flows. The flowing current of the audio signal alternates, creating an electromagnetic field which is opposed by the permanent magnetic field of the magnetic circuit 804. This causes the voice coil assembly 806 and the attached lever 800 to move. The lever 800 may be attached to a diaphragm, such as diaphragm 102 of FIG. 1A, at point P via a connector such as a hinge or link.

Figure 8B:
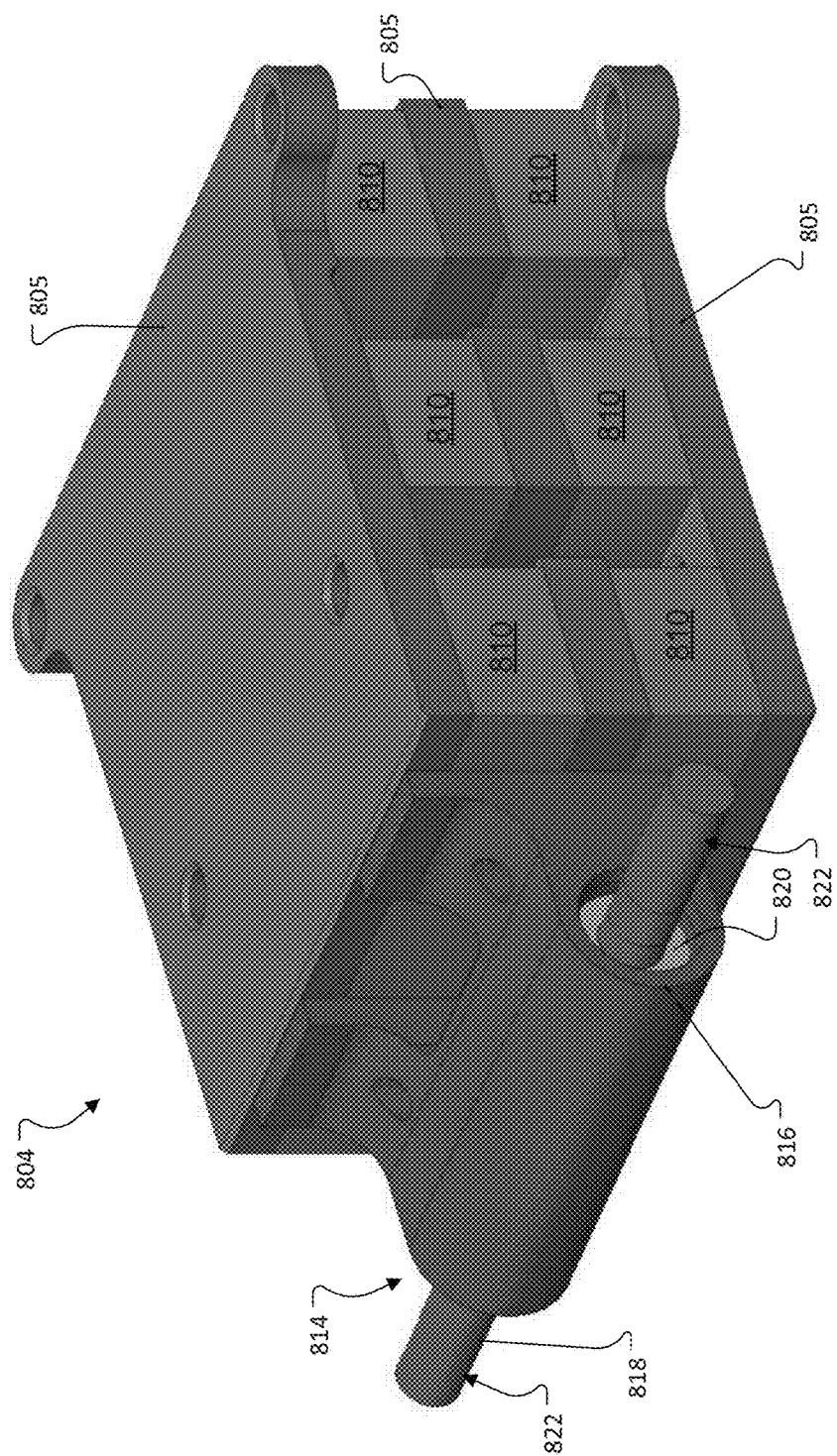
FIG. 8B is a perspective view of a stator (magnetic circuit) from the moving coil motor of FIG. 8A.

The motor 802 drives the lever 800 in oscillatory motion about a pivot 814. Referring to FIG. 8B, the pivot 814 includes at least one elastomeric torsion bushing that comprises an outer member 816, an inner (pin) member 818, and an elastomeric member 820. As in the implementations described above, the inner surface of the elastomeric member 820 is bonded to the outer surface of the inner member 818, such as by forming the elastomeric member 820 directly on the outer surface of the inner member 818 in a mold-in-place process. The outer surface of the elastomeric member 820 is coupled to the outer member 816 via compression. In that regard, the elastomeric member 820 can be coupled to the outer member 816 using any of the techniques described above (e.g., interference fit or compression sleeve).

In the implementation illustrated in FIGS. 8A & 8B, opposite end portions 822 (FIG. 8B) of the inner member 818 are mechanically secured to the lever 800, and the outer member 816 is fixed to the magnetic circuit 804, which, in turn, is fixed to a mechanical ground reference, such the enclosure 104 or the frame 108 of the loudspeaker 100 of FIG. 1A. Thus, in contrast to the implementations discussed above, the inner member 818 rotates with the lever 800, and the outer member 816 remains stationary relative to the mechanical ground.

In some cases, the loudspeakers may include multiple levers for driving motion of the diaphragm. Each of the levers may be provided with a corresponding pivot, and each may be driven by an associated oscillatory force source. Examples of loudspeakers with multiple levers are described in U.S. patent application Ser. No. 14/200,614, filed Mar. 7, 2014.

A number of implementations have been described. Nevertheless, it will be understood that additional modifications may be made without departing from the spirit and scope of the inventive concepts described herein, and, accordingly, other implementations are within the scope of the following claims.

What is claimed is:

1. A loudspeaker comprising:
   an acoustic diaphragm;
   an oscillatory force source;
   a lever coupling the oscillatory force source to the acoustic diaphragm; and
   a pivot coupled to the lever such that the lever moves in an arcuate path about the pivot when the oscillatory force source applies a force to the lever,
   wherein the pivot comprises at least one torsion bushing, the at least one torsion bushing comprising:
   a first member;
   a second member movable relative to the first member;
   an elastomeric member coupling the first member to the second member; and
   a compression sleeve disposed between the second member and the elastomeric member, and
   wherein the first member or the second member is coupled to and moves with the lever, and
   wherein an outer surface of the elastomeric member is coupled to the second member via mechanical compression.

2. The loudspeaker of claim 1, wherein the outer surface of the elastomeric member engages an inner surface of the second member in an interference fit.

3. The loudspeaker of claim 2, wherein in an uncompressed state the elastomeric member has cylindrical outer surface having a first diameter, and the second member has a cylindrical inner surface having a second diameter, and wherein the first diameter is larger than the second diameter.

4. The loudspeaker of claim 3, wherein the outer surface of the elastomeric member is compressed between 6% and 14%.

5. The loudspeaker of claim 1, wherein the torsion bushing further comprises granular particles disposed between the outer surface of the elastomeric member and the inner surface of the second member for increased friction therebetween.

6. The loudspeaker of claim 5, wherein the granular particles are supported in a semisolid lubricant or high viscosity liquid which substantially evaporates or dries out after assembly.

7. The loudspeaker of claim 1, wherein the oscillatory force source comprises a moving magnet motor.

8. The loudspeaker of claim 1, wherein the oscillatory force source comprises a moving coil motor.

9. The loudspeaker of claim 1, wherein the second member comprises a first clamp portion and a second clamp portion, which mechanically couples to the first clamp portion to compress the elastomeric member therebetween.

10. The loudspeaker of claim 9, wherein the first clamp portion includes a first surface for engaging a first section of the outer surface of the elastomeric member, and the second clamp portion includes a second surface for engaging a second section of the outer surface of the elastomeric member.

11. The loudspeaker of claim 9, wherein the first clamp portion is coupled to the lever.

12. The loudspeaker of claim 11, wherein the first clamp portion is coupled to the lever with fasteners.

13. The loudspeaker of claim 11, wherein the first clamp portion is welded to the lever.

14. The loudspeaker of claim 11, wherein the first clamp portion is formed integrally with the lever.

15. The loudspeaker of claim 1, wherein the elastomeric member circumferentially surrounds the first member and has an inner surface that is bonded to an outer surface of the first member.

16. The loudspeaker of claim 15, wherein the elastomeric member is cylindrical and coaxial with first member.

17. The loudspeaker of claim 15, wherein the inner surface of the elastomeric member is bonded to the outer surface of the first member with an adhesive.

18. The loudspeaker of claim 15, wherein the elastomeric member is molded in place about the outer surface of the first member.

19. The loudspeaker of claim 1, wherein the second member is swaged over the elastomeric member.

20. The loudspeaker of claim 1, wherein the second member engages the compression sleeve to exert compression on the elastomeric member.

21. The loudspeaker of claim 1, wherein the compression sleeve includes one or more slots for accommodating compression of the compression sleeve about the elastomeric member.

22. The loudspeaker of claim 1, wherein the compression sleeve has a cylindrical outer surface which engages a cylindrical inner surface of the second member.

23. The loudspeaker of claim 1, wherein the compression sleeve has a cylindrical inner surface which engages a cylindrical outer surface of the elastomeric member.

24. An apparatus comprising:
   a load;
   an oscillatory force source;

a lever coupling the oscillatory force source to the load; and a pivot coupled to the lever such that the lever moves in an arcuate path about the pivot when the oscillatory force source applies a force to the lever, wherein the pivot comprises at least one torsion bushing, the at least one torsion bushing comprising:

a first member;

a second member movable relative to the first member;

an elastomeric member coupling the first member to the second member; and a compression sleeve disposed between the second member and the elastomeric member, and wherein the first member or the second member is coupled to and moves with the lever, and wherein an outer surface of the elastomeric member is coupled to the second member via mechanical compression.

* * * * *